US010007618B2

(12) United States Patent
Franko

(10) Patent No.: US 10,007,618 B2
(45) Date of Patent: *Jun. 26, 2018

(54) MULTI-SOURCE ADDRESS TRANSLATION SERVICE (ATS) WITH A SINGLE ATS RESOURCE

(71) Applicant: INTEL CORPORATION, Santa Clara, CA (US)

(72) Inventor: Itay Franko, Herzlia (IL)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/451,106

(22) Filed: Mar. 6, 2017

(65) Prior Publication Data
US 2017/0177495 A1 Jun. 22, 2017

Related U.S. Application Data

(63) Continuation of application No. 14/493,417, filed on Sep. 23, 2014, now Pat. No. 9,632,948.

(51) Int. Cl.
G06F 12/10 (2016.01)
G06F 12/08 (2016.01)
G06F 13/28 (2006.01)
G06F 12/0802 (2016.01)

(52) U.S. Cl.
CPC .......... G06F 12/10 (2013.01); G06F 12/0802 (2013.01); G06F 13/28 (2013.01); G06F 2212/60 (2013.01); G06F 2212/65 (2013.01)

(58) Field of Classification Search
CPC ............ G06F 12/1027; G06F 12/0864; G06F 12/1081; G06F 2212/1008; G06F 2212/6032; G06F 2212/608; G06F 2212/651; G06F 12/0292; G06F 12/10; G06F 12/145; G06F 2212/1016; G06F 2212/681; Y02B 60/1225
See application file for complete search history.

(56) References Cited

U.S. PATENT DOCUMENTS

| 9,632,948 | B2 * | 4/2017 | Franko ................ G06F 12/0864 |
| 2006/0206687 | A1 | 9/2006 | Vega |
| 2008/0091855 | A1 | 4/2008 | Moertl et al. |
| 2008/0189506 | A1 | 8/2008 | Kopec et al. |
| 2011/0022818 | A1 | 1/2011 | Kegel et al. |
| 2014/0168227 | A1 | 6/2014 | Meixner |

* cited by examiner

Primary Examiner — Zhuo Li
(74) Attorney, Agent, or Firm — Lowenstein Sandler LLP

(57) ABSTRACT

Disclosed is an address translation system. The processor includes a first address translator circuit and a second address translator circuit, coupled to a first functional unit and a second functional unit, respectively. The first address translator circuit translates a first original address to a first translated address and the second address translator translates a second original address to a second translated address as first-level address translation services (ATSs). An arbiter circuit is coupled between the first and second address translator circuits and a memory management circuit. The memory management circuit translates addresses as a second-level ATS when requested by at least one of the first address translator circuit or the second address translator circuit.

20 Claims, 12 Drawing Sheets

MULTI-SOURCE ADDRESS TRANSLATION SERVICE (ATS) WITH A SINGLE ATS RESOURCE

RELATED APPLICATIONS

This application is a continuation of U.S. application Ser. No. 14/493,417, filed Sep. 23, 2014, the entire contents of which are incorporated by reference herein.

FIELD

The present disclosure generally relates to information processing and, more specifically, relates to multi-source address translation service (ATS) with a single ATS resource.

BACKGROUND

Direct memory access (DMA) is a mechanism that allows a device to directly access system memory for data transfer without the intervention of a central processing unit (CPU). DMA can be used to transfer large blocks of data from the device to memory or vice versa. The role of the CPU in DMA data transfer is to initiate the DMA. Once the data transfer is complete, the device may inform the CPU by generating an interrupt.

BRIEF DESCRIPTION OF THE DRAWINGS

The present disclosure is illustrated by way of examples, and not by way of limitation, and may be more fully understood with references to the following detailed description when considered in connection with the figures.

DETAILED DESCRIPTION

Figure 1A:
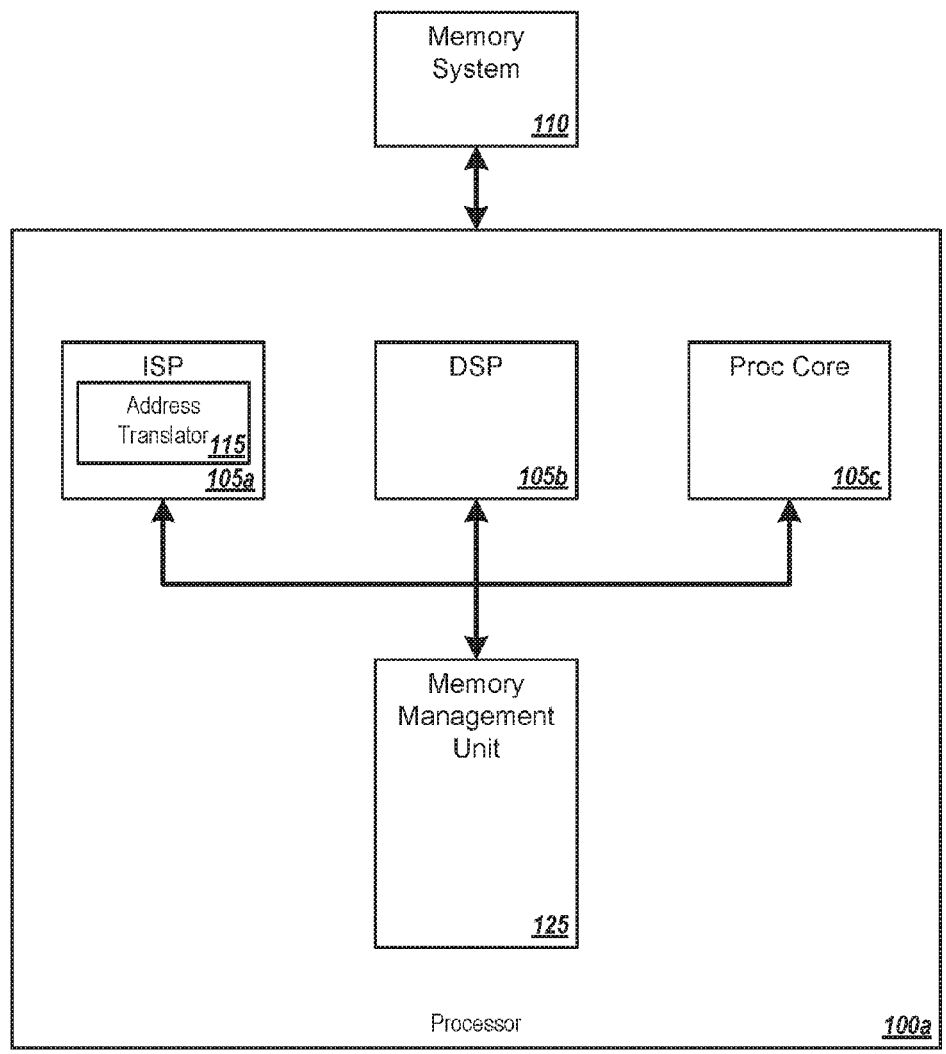
FIG. 1A illustrates a block diagram illustrating an example processor for address translation according to some embodiments.

The present disclosure relates to direct memory access (DMA) for one or more devices of a system. Conventional systems that permit DMA may create a protection domain for each device in the system. The protection domain can include a pre-assigned domain or a specific physical memory region. DMA isolation can be achieved by restricting access to a protection domain's physical memory from I/O devices not assigned to the protection domain by using an address-translation table. The address-translation table provides the ability to separate each device's resources. This DMA isolation is typically performed by a specialized address translator, such as a hardware input-output memory management unit (IOMMU). When a given device tries to gain access to a certain memory location at a memory address using a DMA request, the address translator looks up access permission of that device for that specific protection domain in the address translation table. If the device tries to access memory locations outside of the permitted range, the address translator blocks the access and reports a fault to system's software. If the device has access permission to that specific protection domain based on the look up in the address-translation table, the address translator translates the memory address and provides the translated address to the device. The device can use the translated address for DMA. The address translator typically is a hardware unit that sits between a DMA-capable device and physical memory of the system. In a virtualization environment, a virtual machine manager (VMM) may manage the address translator. In a native environment (non-virtualized), an operating system (OS) of the system may manage the address translator. A conventional address translator may translate an address of each incoming DMA request from a device to a corresponding physical memory address. Translations of multiple DMA requests from the device may excessively consume processor resources and may overburden the address translator especially when the device initiates a large amount of DMA requests. Further, under conventional approaches, when multiple DMA-capable devices initiate DMA requests at the same time, an arbiter prioritizes the requests to be handled in order and one at a time by the address translator. Handling requests one at a time and in order can negatively impact performance and speed of the address translator, the devices and the system as a whole.

Embodiments of the present disclosure are directed to multi-source address translation service (ATS) with a single ATS resource. In one embodiment, an address translator is coupled to a memory management unit (MMU) that is operable to receive a translation request for an original address and provide a translated address of the original address. The address translator has an associated cache to store addresses. The stored addresses can include an original (i.e., non-translated) address as well as a related translated address. The original address may be an address that is associated with a previous transaction and the related translated address can be a translated version of the original address. The address translator may provide a first-level address translation service (ATS) for multiple sources using the associated cache, whereas the MMU may provide a second-level ATS when needed by the address translator. For example, the address translator receives, from a first device, a transaction (e.g., a DMA request) with a current memory address. The address translator determines whether the transaction is to be processed using either the first-level ATS or the second-level ATS. For example, the address translator checks the cache to determine whether the current memory address relates to the original address that is stored in the cache. For example, the current memory address and the original address are related when they are the same, when they are part of a group of transactions, or with they share a common indication (e.g., a burst notation, a base address, or the like). The current memory address and the original address may also be related when they both are associated with linear data that is stored on a same memory page. In an example, the device may send multiple transactions to the address translator, where each of the multiple transactions may be associated with linear video data. For the first transaction, the cache may not have an original address or a translated address. The address translator sends an address translation request to the MMU. The MMU sends the translated address to the address translator for further processing, as described below. The address translator may also store the original address and the translated address in the cache for later use when processing other transactions. The address translator may use the translated address in the cache for later transactions instead of requesting a new translated address from the MMU.

When address translator determines to process the transaction using the first-level ATS, the address translator may substitute the current memory address of the transaction with the translated address already stored in the associated cache, and dispatches the transaction with the translated address. When the address translator determines to process the transaction using the second-level ATS, the address translator sends the current memory address to the MMU for processing using the second-level ATS. Once the MMU translates the current memory address to a current translated address, the address translator receives the current translated address from the MMU, and dispatches the transaction with the current translated address to the memory system. Since the address translator, as described herein, handles some of the address translation that is conventionally handled by the MMU, performance of the MMU, and the overall system by extension, can be improved.

FIG. 1A illustrates a block diagram illustrating an example processor 100a for address translation. The processor 100a includes at least one functional unit 105, an address translator 115 (e.g., first-level address translator) and a memory management unit 125 (e.g., second-level address translator). The processor 100 is coupled to a memory system 110.

Processor 100a may be any type of processor, including a general purpose microprocessor, such as a processor in the Intel® Pentium® Processor Family, Intel® Xeon® Processor Family, Intel® Core™ Processor Family, or other processor family from Intel® Corporation, or another processor from another company, or a special purpose processor or microcontroller. Processor 100a may include multiple threads and multiple execution cores, in any combination. In one embodiment, the processor 100a is integrated in a single integrated circuit die having multiple hardware functional units 105a-c (hereafter referred to as a multi-core system). The multi-core system may be a multi-core processor package, but may include other types of functional units than just processor cores. Functional hardware units 105a-c may be processor cores, digital signal processors (DSP), image signal processors (ISP), graphics cores (also referred to as graphics units), voltage regulator (VR) phases, input/output (I/O) interfaces (e.g., serial links, DDR memory channels) and their controllers, network controllers, fabric controllers, or any combination thereof. For purposes of illustration, the processor 100a includes three functional units 105a-c—an ISP 105a, a DSP 105b and a processor core 105c.

Memory system 110 includes any type of persistent or non-volatile media, such as a flash memory device, a solid-state device (SSD), a memristor, phase change memory (e.g., PCS, PCM, PCME, PCRAM, Ovonic Unified Memory, Chalcogenide RAM, C-RAM, etc.), or other storage or memory device. The memory system 110 can be byte-addressable. Memory system 110 stores instructions and/or data represented by data signals that are to be executed by the processor 100a. The processor 100a is coupled to the memory system 110 via a processor bus (not shown). In some embodiments, the memory system 110 is a dual-inline memory module (DIMM). Memory system 110 may also include volatile memory, such as in the form of random access memory (RAM) or registers.

The processor 100a also includes a memory management unit 125. The memory management unit 125 receives DMA requests and performs address translation services related to the DMA requests. In some embodiments, the memory management unit 125 can handle address translation for one DMA request at a time. In other embodiments, the memory management unit 125 can handle address translation for multiple DMA requests at a time. In some embodiments, the memory management unit 125 is an input/output memory management unit (IOMMU) 125.

One or more of the hardware functional units 105a-c may include an address translator 115. The address translator 115 serves to reduce operations that are conventionally handled by the memory management unit 125 by providing first-level address translation services (ATS) while the memory management unit 125 provides second-level ATS. To that end, the address translator 115 stores at least one translated address in relation to an original address in a cache. Upon receiving a DMA request, the address translator 115 determines whether the DMA request is to be processed using either the first-level ATS or the second-level ATS. The address translator 115 translates a current memory address of the DMA request to a current translated address using the first-level ATS or the second-level ATS based on the determination. The address translator 115 dispatches the transaction with the current translated address to the memory system 110 for further processing (e.g., read, write, modify).

In some embodiments, the address translator 115 determines whether the DMA request is to be processed using the first-level ATS or the second-level ATS by checking the cache to determine whether the DMA request has a current address that relates to a last original address. If so, then the address translator 115 can associate the translated address from the cache with the DMA request (e.g., substitute the current address with the translated address), after which the DMA request can be forwarded directly to the memory system 110 using the translated address. If the DMA request has a current address that does not match the last original address, the address translator 115 can request a current translated address from the memory management unit 125. After receiving the current translated address from the memory management unit 125, the address translator 115 can associate the current translated with the DMA request after which the DMA request can be forwarded directly access the memory system 110 using the current translated address. The address translator 115 can store the current translated address in association with the current address in the cache 120 for later use, such as for subsequent, linear transactions, as described herein.

In some embodiments, the data that the address translator 115 receives is linear data or is sequential data in data chunks. For example, the data may be video data that is divided into chunks of a fixed length or size. A first video data chunk can be a first 64 bytes of video data, a second video data chunk can be a second 64 bytes of the video data, and so forth. Some of the data chunks can be associated with the same memory page. In some embodiments, data that is associated with the same memory page has the same base address. For example, the base address for the first video data chunk and the second video data chunk can be the same. By identifying two sequential data chunks with the same base address, the address translator 115 can infer that both data chunks are stored on the same memory page. Using this inference, the address translator 115 can use the translated address from the first data chunk for the second data chunk without obtaining a new translated address for the second data chunk from the memory management unit 125.

In some embodiments where the transaction and the second transaction include linear data, a first transaction (or first data chunk) in a set of transactions (or set of data chunks) includes a head-of-transaction indicator which indicates to the address translator 115 that the first transaction (or first data chunk) is to be processed using a second-level ATS, such as the MMU 125. A second transaction (or second data chunk) in the set of transactions (or the set of data chunks) may not include the head-of-transaction indicator, which indicates to the address translator 115 that the transaction is to be processed using a first-level ATS (e.g., the address translator 115). The address translator 115 may determine whether the transaction includes the head-of-transaction indicator to determine whether the transaction is to be processed using either the first-level ATS or the second-level ATS.

In some embodiments, associated data share a common burst notation. The burst notation indicates that a set of data chunks (or a set of transactions) are all associated with the same burst, the data chunks are linear and the data chunks all reside within an address boundary (e.g., 4 kilobyte boundary). The address translator 115 can determine whether a transaction is to be processed using either the first-level ATS or the second-level ATS by identifying whether the transaction includes the burst notation and/or a unique header. In an example, the common burst notation identifies sequential data that is stored together on the same memory page. In another example, the first data chunk in the set of data includes a unique header that indicates that the first data chunk includes an address that is to be translated by the memory management unit 125. Subsequent data chunks may include the common burst notation, but do not have the unique header. The address translator 115 can use the translated address for all data chunks that include the common burst notation.

Figure 1B:
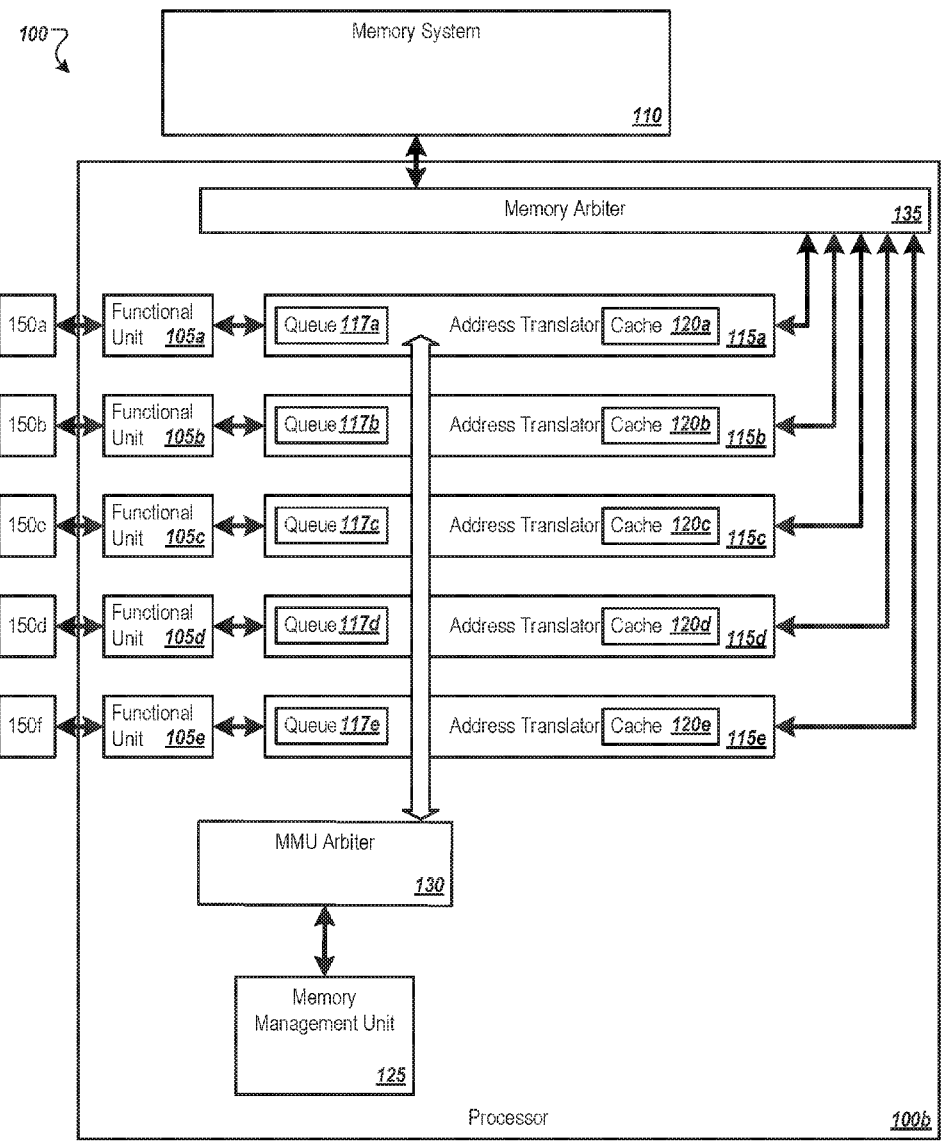
FIG. 1B illustrates an example processor with multiple hardware functional units and multiple address translators according to some embodiments.

FIG. 1B illustrates an example processor 100b with multiple hardware functional units 105 and multiple address translators 115. Each hardware functional units 105 may have an associated address translator 115. For example, functional unit 105a is associated with address translator 115a. Each address translator 115 can also include a queue 117 that receives transactions (e.g., DMA requests). The address translator 115 can process transactions that are in the queue 117. Each address translator 115 can include a cache 120 to store addresses. The cache 120 may be directly connected to the address translator 115. Alternatively, the cache 120 may be connected to the address translator 115 over a network (not shown). The cache 120 may store one or more translated address in association with one or more original address. For example, the address translator 115 can store the last original address as well as the related translated address in a cache 120. In some embodiments, the address translator 115 performs a lookup operation for addresses stored in the cache 120. For example, when the queue 117 of address translator 115 receives a DMA request with a current memory address from the functional unit 105, the address translator 115 can determine whether the address translator 115 can perform address translation for the transaction (e.g., first-level ATS) or whether the memory management unit 125 is to perform the ATS for the transaction (e.g., second-level ATS). To determine whether to perform the first-level ATS, the address translator 115 can check the cache 120 to determine whether a stored original address relates to the current address. When the current address relates to the original address, then the address translator 115 is to perform the first-level ATS. The address translator 115 can associate a translated address (also may be stored in the cache in association with the original address) with the transaction. In some embodiments, the address translator 115 substitutes the current address of the transaction with the translated address. Once associated with the translated address, the transaction may be provided to the memory system 110 where it can be read or written.

When it is determined to process the transaction using the second-level ATS, the address translator 115 can send the current address to the MMU 125. The MMU 125 can translate the current address to a current translated address and send the current translated address to the address translator 115. After receiving the current translated address from the MMU, the address translator 115 can dispatch the transaction with the current translated address to the memory system 110.

Processor 100b may also include an MMU arbiter 130 that handles multiple translation requests from multiple address translators 115a-f and determines a priority of the translation requests to be dispatched to the memory management unit 125. Once the MMU arbiter 130 prioritizes the multiple translation requests, the MMU arbiter 130 sends the translation requests to the memory management unit 125 according to the determined priority. The MMU arbiter 130 can handle multiple translation requests from a single functional unit 105. Alternatively, the MMU arbiter 130 handles translation requests from multiple functional units (e.g., functional units 105a-f). As the MMU arbiter 130 receives and prioritizes translation requests, the MMU arbiter 130 can place the translation requests in an MMU queue (not shown) that the memory management unit 125 is to process.

In some embodiments, a memory arbiter 135 can be coupled to the address translators 115a-f. The memory arbiter 135 can manage and prioritize transactions (e.g., DMA requests) in a similar manner as the arbiter 130. The memory arbiter 135 can receive multiple transactions from multiple address translators 115a-f and can determine a priority of the transactions to be dispatched to the memory system 110. Once the memory arbiter 135 prioritizes the multiple transactions, the memory arbiter 135 sends the transactions to the memory management unit 125 according to the determined priority. The memory arbiter 135 can handle multiple transactions from a single functional unit 105. Alternatively, the memory arbiter 135 handles transactions from multiple functional units (e.g., functional units 105a-f). As the memory arbiter 135 receives and prioritizes transactions, the memory arbiter 135 can place the transactions in a memory queue (not shown) that the memory system 110 is to process.

In some embodiments, any number of devices 150, such as devices 150a-f, are coupled to the processor 100b. Each of these devices 105a-f may need address translation services and are thus coupled to a corresponding address translator 115a-f, respectively. Similarly, each address translator 115a-f is associated with a cache 120a-f. Each address translator 115a-f can operate independently of the other address translators 115a-f and/or the memory management unit 125.

In an example, processor 100b is part of a digital camera that includes five devices 105a-f. Each of the devices 105a-f represents a DMA-enabled resource that facilitates image capturing, image processing, video processing, or the like. For example, one of devices 105a-f can be an input system for media capturing and another device 105a-f can be a packaging system. Another one of the devices 105a-f can be a video processing system and another can be an audio processing system. Each address translator 115 may attempt to perform as much as possible first-level ATS on transactions from the devices 105a-f, which may result in reducing an amount of ATS that is typically provided by the memory management unit 125. When the address translator 115 cannot perform the first-level ATS on a transaction, the address translator 115 sends a translation request to the memory management unit 125 to perform second-level ATS. Reduction of second-level ATS that the memory management unit 125 performs may result in performance improvement for the memory management unit 125 and the digital camera. The processor 100b may be part of other devices than digital cameras where multiple address translators 115 can perform first-level ATS for multiple functional units, as well a single second-level ATS resource (e.g., memory management unit 125) to perform second-level ATS when needed by the multiple address translators.

Figure 2:
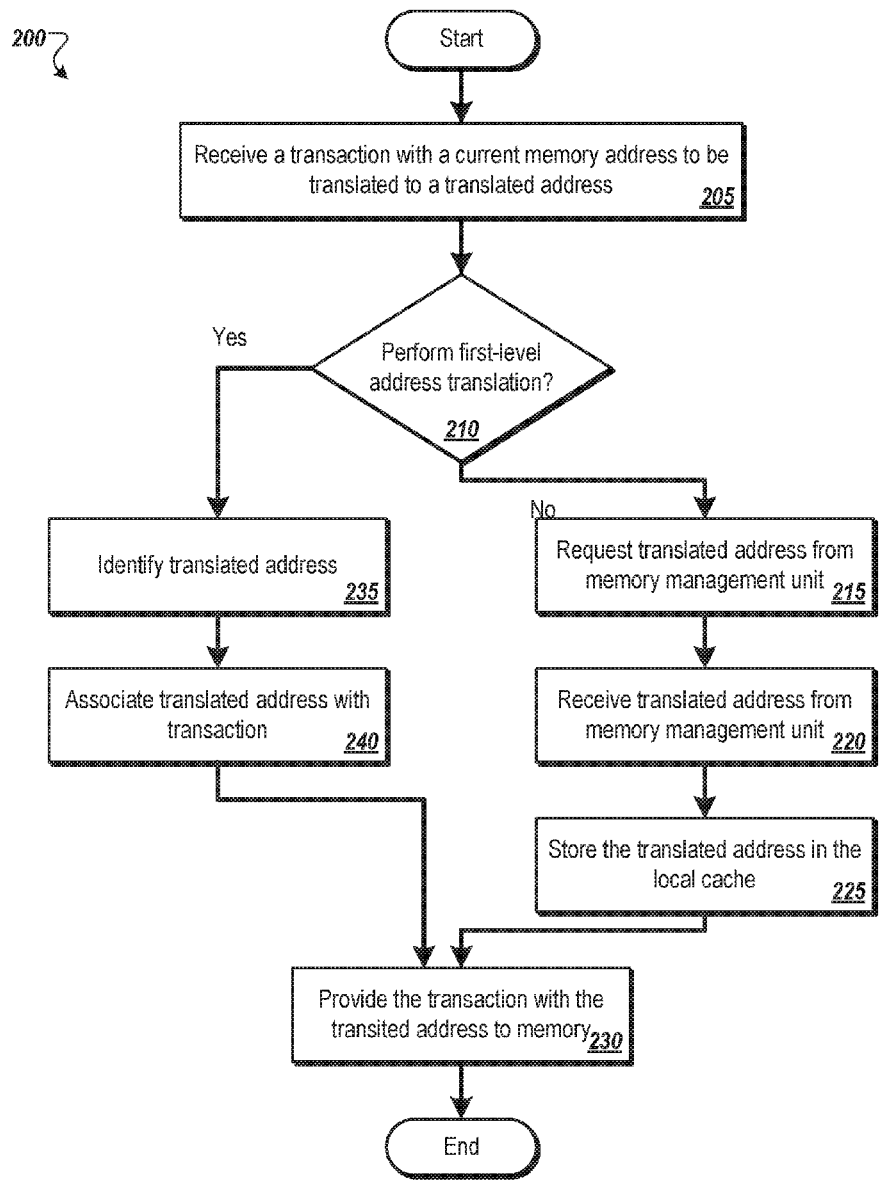
FIG. 2 illustrates a method for performing address translation according to some embodiments.

FIG. 2 illustrates a method for performing address translation according to some embodiments. Method 200 may be performed by processing logic that may comprise hardware (e.g., circuitry, dedicated logic, programmable logic, microcode, etc.), software (such as operations being performed by a functional unit), firmware or a combination thereof. In some embodiments, method 200 is performed by a processor and more specifically an address translator 115 of FIGS. 1A-B. Alternatively, other components of the computer architecture 100 may perform some or all of the operations of the method 200.

Referring to FIG. 2, the method 200 begins at block 205 by processing logic receiving a transaction with a current memory address. The transaction can include a DMA request from a device (e.g., device 150 of FIG. 1B). At block 210, the processing logic determines whether first-level translation or second-level translation is to be performed on the current memory address. In making this determination, the processing logic can check a cache to determine whether the current memory address is related to an original address stored in the cache. In another embodiment, the processing logic can determine whether the first-level translation or second-level translation using other mechanisms, such as a head-of-transaction indicator or a burst notation as described herein.

When, at block 210, the current memory address does not relate to the original address, at block 215 the processing logic sends, to a second-level address translator, a translation request to translate the current memory address. In some embodiments, the second-level address translator is the memory management unit (MMU) 125 of FIGS. 1A-B. In one embodiment, a single second-level address translator is used for multiple first-level address translators. In other embodiments, multiple second-level translators may be used. In some embodiments, the processing logic generates and sends a translation request for the MMU to translate the original address to the translated address.

At block 220, the processing logic receives a translated address from the second-level address translator. The processing logic can associate the translated address with the transaction. At block 225, the processing logic stores the translated address in the cache in association with the current memory address. In some embodiments, the processing logic substitutes the original address with the current memory address and stores the translated address in association with the current memory address. The translated address can replace any other translated addresses that were previously stored in the cache.

At block 230, the processing logic dispatches the transaction (e.g., DMA request) with the translated address to a memory system. In some embodiments, the processing logic dispatches the data to a memory arbiter that receives transactions from multiple sources (e.g., from multiple functional units 105 of FIGS. 1A-B). The memory arbiter prioritizes the transactions from the multiple sources and sends the transactions to a memory system according to its respective priority.

When, at block 210, the current memory address relates to the original address, the processing logic identifies a translated address at block 235. A translated address can also be stored in the cache in association with the original address. In some embodiments, the processing logic uses the original address in the local cache to lookup the translated address and then associates the translated address with the data to be provided to the memory. For example, at block 235, the processing logic can query the cache using the original address as a key to locate the translated address. Once the processing logic identifies the translated address, the processing logic associates the translated address with the transaction (block 240). In some embodiments, the processing logic substitutes the current address of the transaction with the translated address stored in the associated cache. Then, the processing logic dispatches the transaction to the memory using the translated address (block 230).

Figure 3:
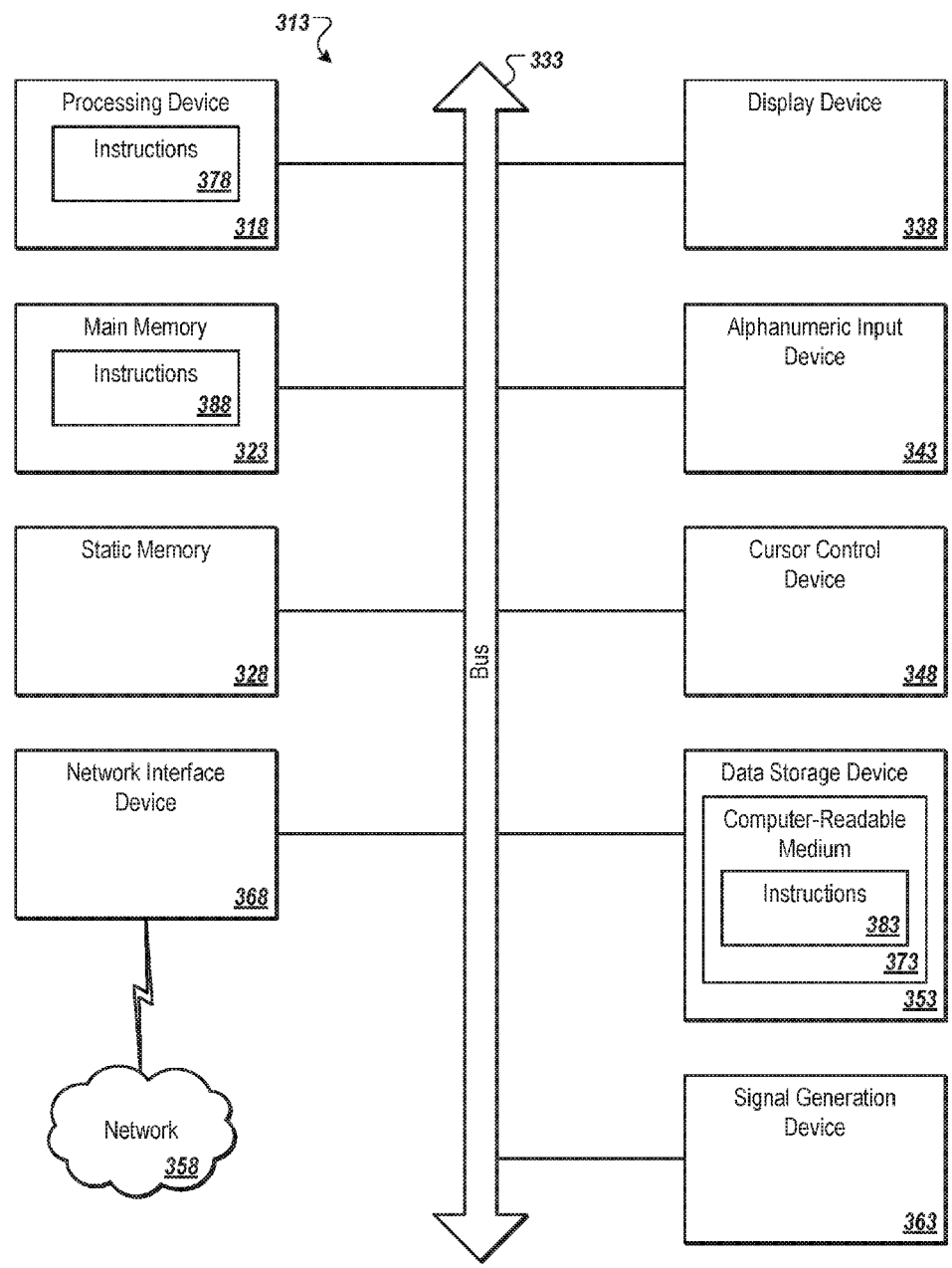
FIG. 3 illustrates a diagrammatic representation of a machine in the example form of a computing system according to some embodiments.

FIG. 3 illustrates a diagrammatic representation of a machine in the example form of a computing system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a game console, a cellular telephone, a digital camera, a handheld PC, a web appliance, a server, a network router, switch or bridge, micro controller, a digital signal processor (DSP), system on a chip, network computers (NetPC), network hubs, wide area network (WAN) switches, or any machine capable of executing a set of instructions (sequential or otherwise) that specify actions to be taken by that machine. Further, while only a single machine is illustrated for the computer architecture 100, the term "machine" shall also be taken to include any collection of machines that individually or jointly execute a set (or multiple sets) of instructions to perform any one or more of the methodologies discussed herein. Embodiments are not limited to computer systems.

The computing system 300 includes a processing device 302, main memory 304 (e.g., read-only memory (ROM), flash memory, dynamic random access memory (DRAM) (such as synchronous DRAM (SDRAM) or DRAM (RDRAM), etc.), a static memory 306 (e.g., flash memory, static random access memory (SRAM), etc.), and a data storage device 316, which communicate with each other via a bus 308.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. In one embodiment, processing device 302 may include one or processing cores. The processing device 302 is configured to execute the processing logic 326 for performing the operations discussed herein. In one embodiment, processing device 302 can be part of the system architecture 100 of FIG. 1. Alternatively, the computing system 300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Computing system 300 is representative of processing systems based on the PENTIUM III™, PENTIUM 4™, Celeron™, Xeon™, Itanium, XScale™, StrongARM™, Core™, Core 2™, Atom™, and/or Intel® Architecture Core™, such as an i3, i5, i7 microprocessors available from Intel Corporation of Santa Clara, Calif., although other systems (including PCs having other microprocessors, engineering workstations, set-top boxes and the like) may also be used. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. In one embodiment, processing device 302 executes a version of the WINDOWS™ operating system available from Microsoft Corporation of Redmond, Wash., although other operating systems (OS X, UNIX, Linux, Android, iOS, Symbian, for example), embedded software, and/or graphical user interfaces, may also be used. Thus, embodiments of the present disclosure are not limited to any specific combination of hardware circuitry and software. One embodiment may be described in the context of a single processor desktop or server system, but alternative embodiments may be included in a multiprocessor system. Computing system 300 may be an example of a 'hub' system architecture.

The computing system 300 may further include a network interface device 322 communicably coupled to a network 318. The computing system 300 also may include a display device 310 (e.g., a liquid crystal display (LCD) or a cathode ray tube (CRT)), an alphanumeric input device 312 (e.g., a keyboard), a cursor control device 314 (e.g., a mouse), a signal generation device 320 (e.g., a speaker), or other peripheral devices. Furthermore, computing system 300 may include a graphics processing unit (not illustrated), a video processing unit (not illustrated) and an audio processing unit (not illustrated). In another embodiment, the computing system 300 may include a chipset (not illustrated), which refers to a group of integrated circuits, or chips, that are designed to work with the processing device 302 and controls communications between the processing device 302 and external devices. For example, the chipset may be a set of chips on a motherboard that links the processing device 302 to very high-speed devices, such as main memory 304 and graphic controllers, as well as linking the processing device 302 to lower-speed peripheral buses of peripherals, such as USB, PCI or ISA buses.

The data storage device 316 may include a computer-readable storage medium 324 on which is stored instructions 326 embodying any one or more of the methodologies of functions described herein. The instructions 326 may also reside, completely or at least partially, within the main memory 304 as instructions 326 and/or within the processing device 302 as processing logic 326 during execution thereof by the computing system 300; the main memory 304 and the processing device 302 also constituting computer-readable storage media.

The computer-readable storage medium 324 may also be used to store instructions 326 utilizing the processing device 302, such as described with respect to FIG. 1, and/or a software library containing methods that call the above applications. While the computer-readable storage medium 324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 4:
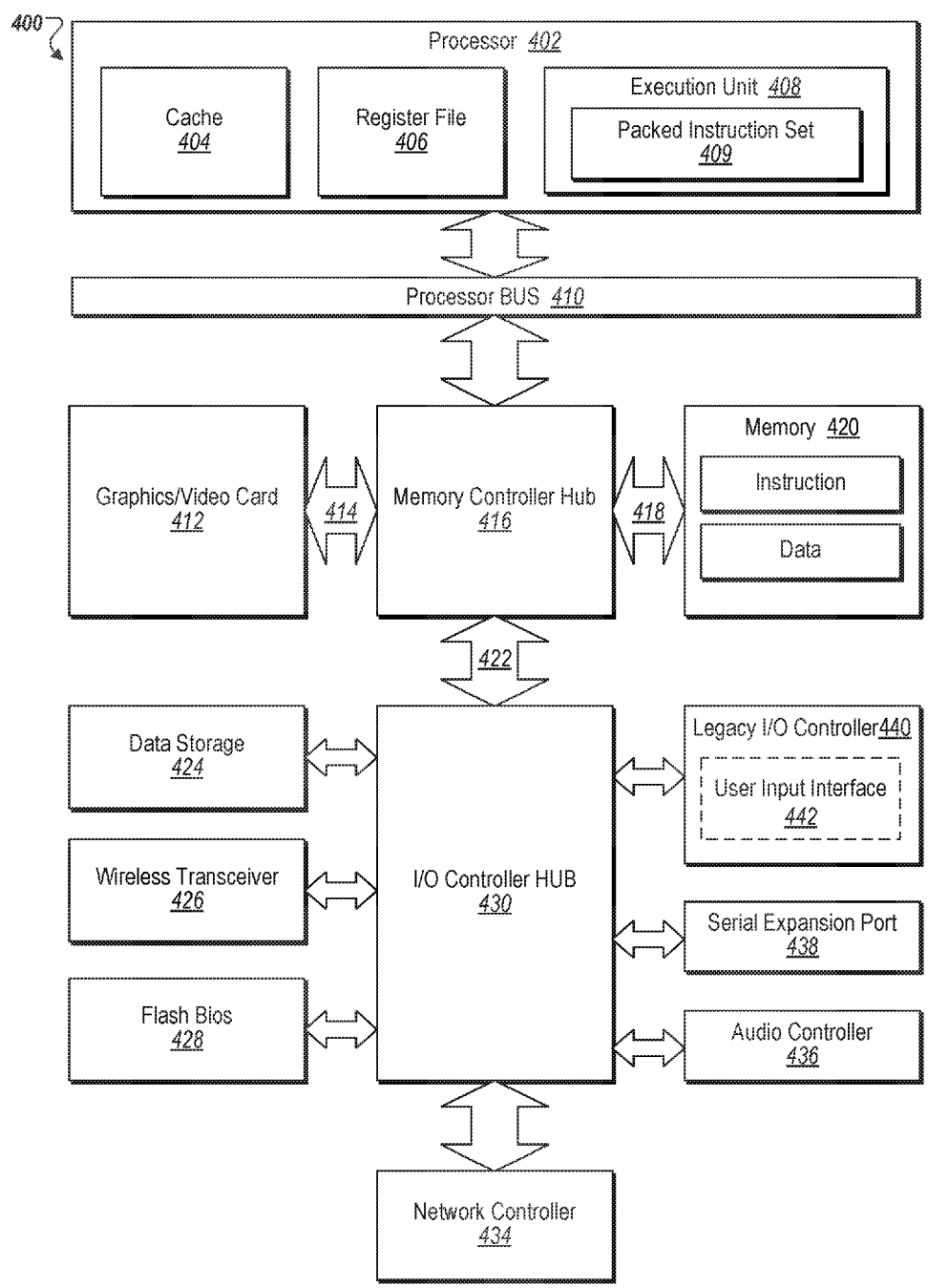
FIG. 4 is a block diagram of an exemplary computer system according to some embodiments.

Turning to FIG. 4, a block diagram of an example computer system formed with a processor that includes execution units to execute an instruction, where one or more of the interconnects implement one or more features in accordance with one embodiment of the present disclosure is illustrated. System 400 includes a component, such as a processor 402 to employ execution units including logic to perform algorithms for processing data, in accordance with the embodiment described herein. Embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 402 includes one or more execution units 408 to implement an algorithm that is to perform at least one instruction. One embodiment may be described in the context of a single processor desktop or server system, but alternative embodiments may be included in a multiprocessor system. System 400 is an example of a 'hub' system architecture. The computer system 400 includes a processor 402 to process data signals. The processor 402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 402 is coupled to a processor bus 410 that transmits data signals between the processor 402 and other components in the system 400. The elements of system 400 (e.g. graphics accelerator 412, memory controller hub 416, memory 420, I/O controller hub 424, wireless transceiver 426, Flash BIOS 428, Network controller 434, Audio controller 436, Serial expansion port 438, I/O controller 430, etc.) perform their conventional functions that are well known to those familiar with the art.

In one embodiment, the processor 402 includes a Level 1 (L1) internal cache memory 404. Depending on the architecture, the processor 402 may have a single internal cache or multiple levels of internal caches. Other embodiments include a combination of both internal and external caches depending on the particular implementation and needs. Register file 406 is to store different types of data in various registers including integer registers, floating point registers, vector registers, banked registers, shadow registers, checkpoint registers, status registers, and instruction pointer register.

Execution unit 408, including logic to perform integer and floating point operations, also resides in the processor 402. The processor 402, in one embodiment, includes a microcode (ucode) ROM to store microcode, which when executed, is to perform algorithms for certain macroinstructions or handle complex scenarios. Here, microcode is potentially updateable to handle logic bugs/fixes for processor 402. For one embodiment, execution unit 408 includes logic to handle a packed instruction set 409. By including the packed instruction set 409 in the instruction set of a general-purpose processor 402, along with associated circuitry to execute the instructions, the operations used by many multimedia applications may be performed using packed data in a general-purpose processor 402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 408 may also be used in micro controllers, embedded processors, graphics devices, DSPs, and other types of logic circuits. System 400 includes a memory 420. Memory 420 includes a dynamic random access memory (DRAM) device, a static random access memory (SRAM) device, flash memory device, or other memory device. Memory 420 stores instructions and/or data represented by data signals that are to be executed by the processor 402.

A system logic chip 416 is coupled to the processor bus 410 and memory 420. The system logic chip 416 in the illustrated embodiment is a memory controller hub (MCH). The processor 402 can communicate to the MCH 416 via a processor bus 410. The MCH 416 provides a high bandwidth memory path 418 to memory 420 for instruction and data storage and for storage of graphics commands, data and textures. The MCH 416 is to direct data signals between the processor 402, memory 420, and other components in the system 400 and to bridge the data signals between processor bus 410, memory 420, and system I/O 422. In some embodiments, the system logic chip 416 can provide a graphics port for coupling to a graphics controller 412. The MCH 416 is coupled to memory 420 through a memory interface 418. The graphics card 412 is coupled to the MCH 416 through an Accelerated Graphics Port (AGP) interconnect 414.

System 400 can use a proprietary hub interface bus 422 to couple the MCH 416 to the I/O controller hub (ICH) 430. The ICH 430 provides direct connections to some I/O devices via a local I/O bus. The local I/O bus is a high-speed I/O bus for connecting peripherals to the memory 420, chipset, and processor 402. Some examples are the audio controller, firmware hub (flash BIOS) 428, wireless transceiver 426, data storage 424, legacy I/O controller containing user input and keyboard interfaces, a serial expansion port such as Universal Serial Bus (USB), and a network controller 434. The data storage device 424 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 5:
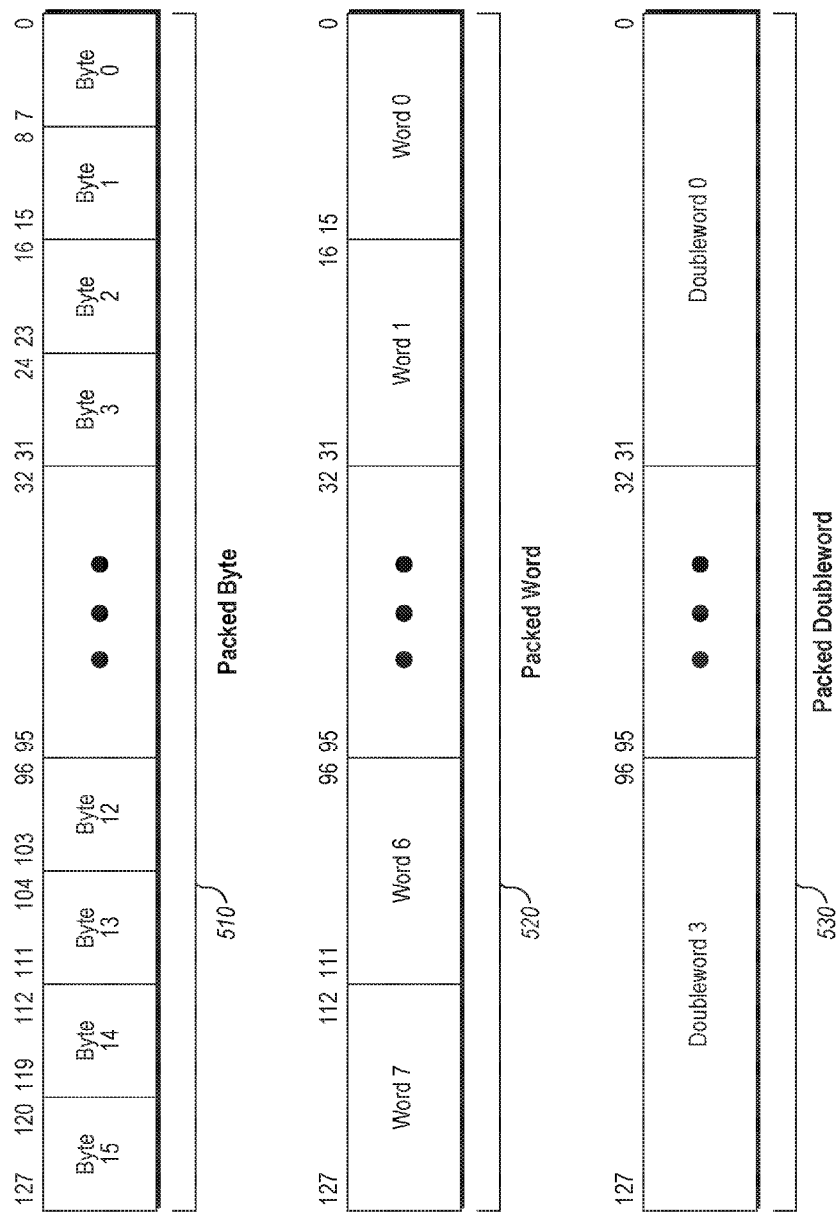
FIG. 5 illustrates packed data types according to some embodiments.

FIG. 5 illustrates various packed data type representations in multimedia registers according to one embodiment of the present disclosure. FIG. 5 illustrates data types for a packed byte 510, a packed word 520, and a packed doubleword (dword) 530 for 128 bits wide operands. The packed byte format 510 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 5 are 128 bit long, embodiments can also operate with 64 bit wide or other sized operands. The packed word format 520 of this example is 128 bits long and contains eight packed word data elements. Each packed word contains sixteen bits of information. The packed doubleword format 530 of FIG. 5 is 128 bits long and contains four packed doubleword data elements. Each packed doubleword data element contains thirty two bits of information. A packed quadword is 128 bits long and contains two packed quad-word data elements.

Figure 6:
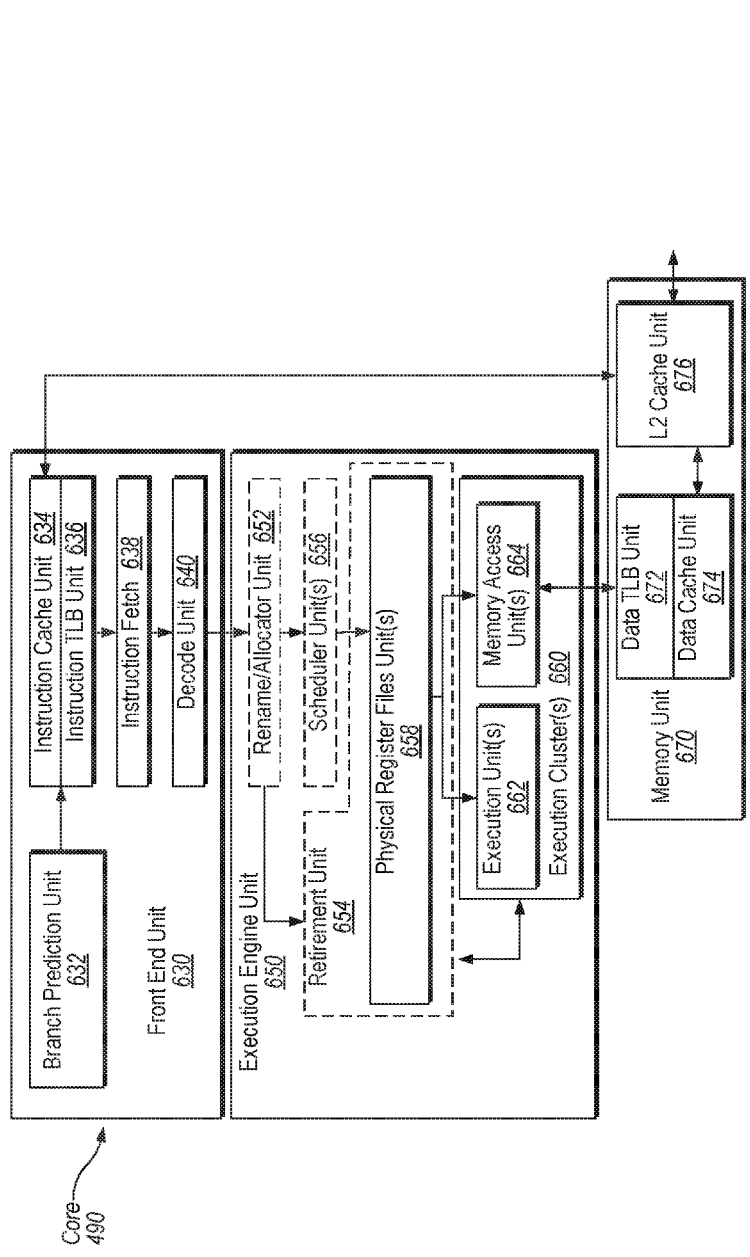
FIG. 6A illustrates elements of a processor micro-architecture according to some embodiments.
FIG. 6B illustrates elements of a processor micro-architecture according to some embodiments.

FIG. 6A is a block diagram illustrating an in-order pipeline and a register renaming stage, out-of-order issue/execution pipeline according to at least one embodiment of the disclosure. FIG. 6B is a block diagram illustrating an in-order architecture core and a register renaming logic, out-of-order issue/execution logic to be included in a processor according to at least one embodiment of the disclosure. The solid lined boxes in FIG. 6A illustrate the in-order pipeline, while the dashed lined boxes illustrates the register renaming, out-of-order issue/execution pipeline. Similarly, the solid lined boxes in FIG. 6B illustrate the in-order architecture logic, while the dashed lined boxes illustrates the register renaming logic and out-of-order issue/execution logic.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

In FIG. 6B, arrows denote a coupling between two or more units and the direction of the arrow indicates a direction of data flow between those units. FIG. 6B shows processor core 690 including a front end unit 630 coupled to an execution engine unit 650, and both are coupled to a memory unit 670.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 162 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory.

By way of example, the register renaming, out-of-order issue/execution core architecture may implement the pipeline 500 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

While register renaming is described in the context of out-of-order execution, it should be understood that register renaming may be used in an in-order architecture. While the illustrated embodiment of the processor also includes a separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
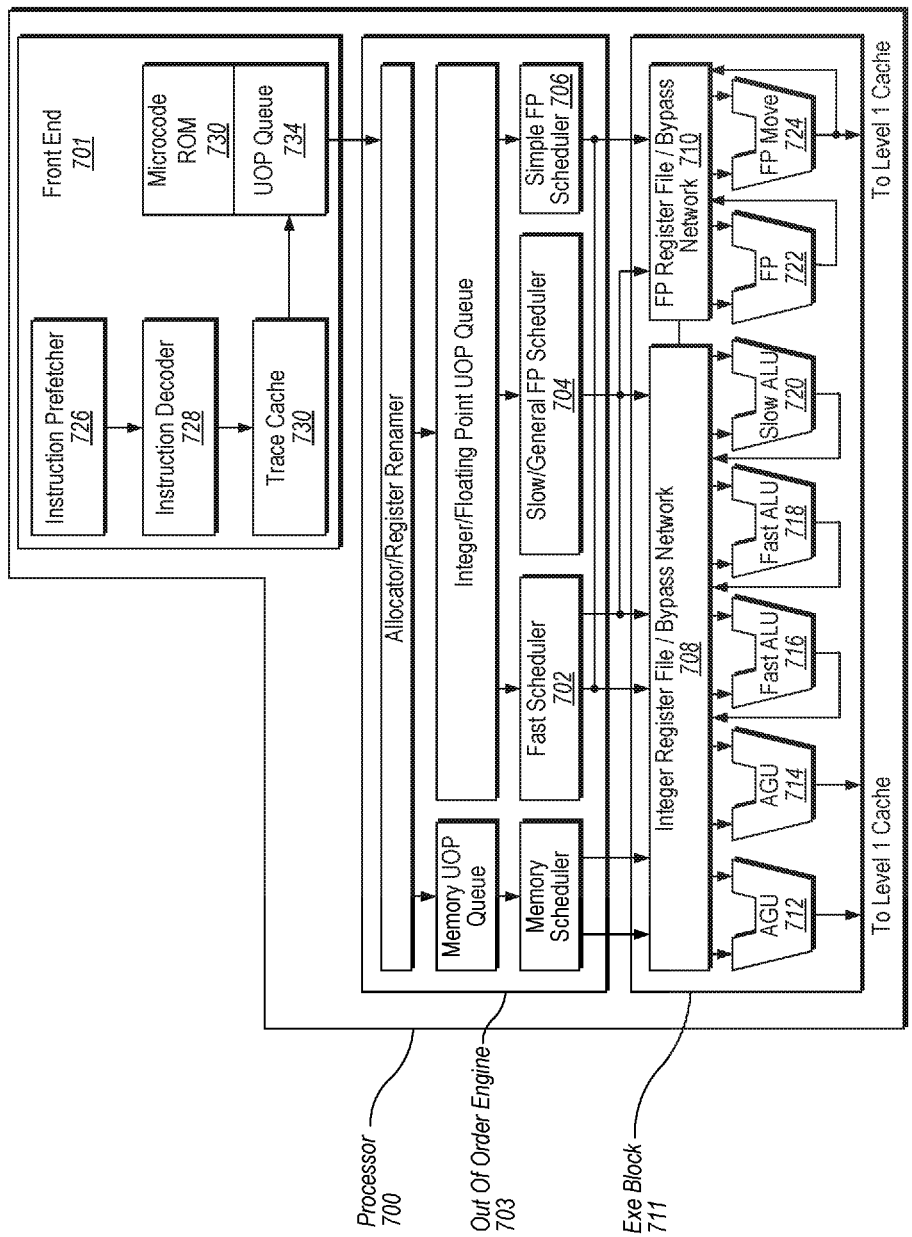
FIG. 7 is a block diagram of a processor according to some embodiments.

FIG. 7 is a block diagram of the micro-architecture for a processor 700 that includes logic circuits to perform instructions in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops need to complete their operation. The fast scheduler 702 of one embodiment can schedule on each half of the main clock cycle while the other schedulers can schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710 for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the present disclosure, instructions involving a floating point value may be handled with the floating point hardware. In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720 are described in the context of performing integer operations on 64 bit data operands. In alternative embodiments, the ALUs 716, 718, 720 can be implemented to support a variety of data bits including 16, 32, 128, 756, etc. Similarly, the floating point units 722, 724 can be implemented to support a range of operands having bits of various widths. For one embodiment, the floating point units 722,

724 can operate on 128 bits wide packed data operands in conjunction with SIMD and multimedia instructions.

In one embodiment, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
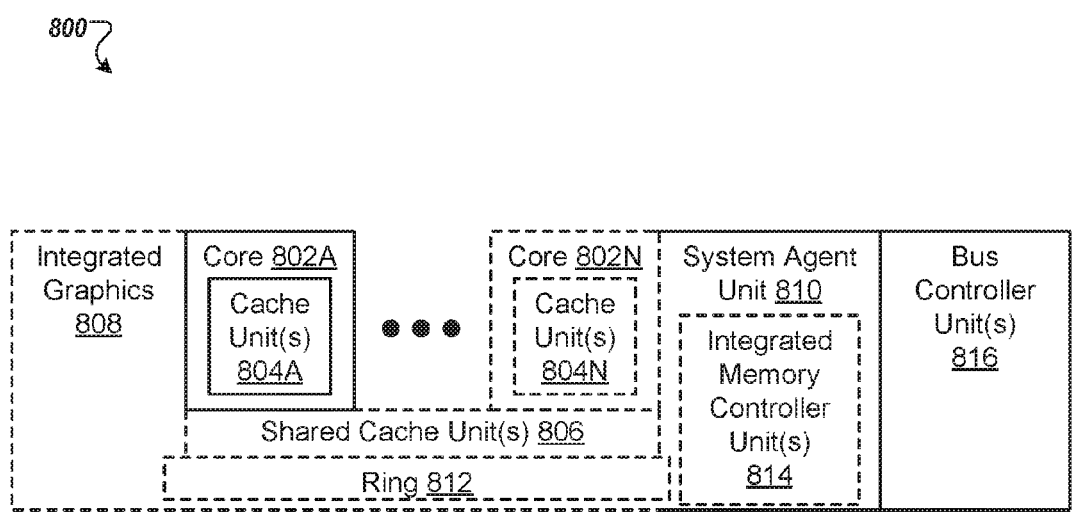
FIG. 8 is a block diagram of a processor according to some embodiments.

FIG. 8 is a block diagram of a single core processor and a multicore processor 800 with integrated memory controller and graphics according to embodiments of the disclosure. The solid lined boxes in FIG. 8 illustrate a processor 800 with a single core 802A, a system agent 810, a set of one or more bus controller units 816, while the addition of the dashed lined boxes illustrates an alternative processor 800 with multiple cores 802A-N, a set of one or more integrated memory controller unit(s) 814 in the system agent unit 810, and an integrated graphics logic 808.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810, alternative embodiments may use any number of well-known techniques for interconnecting such units.

In some embodiments, one or more of the cores 802A-N are capable of multithreading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing a subset of that instruction set or a different instruction set. As a further example, the cores can be different architecture.

The processor may include one or more different general-purpose processors, such as a Core™ i3, i5, i7, 2 Duo and Quad, Xeon™, Itanium™, Atom™, XScale™ or StrongARM™ processor, which are available from Intel Corporation, of Santa Clara, Calif. For example, one core can be a Core i7™ core while another core of the processor can be an Atom™ core. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 800 may be a part of and/or may be implemented on one or more substrates using any of a number of process technologies, such as, for example, BiCMOS, CMOS, or NMOS.

Figure 9:
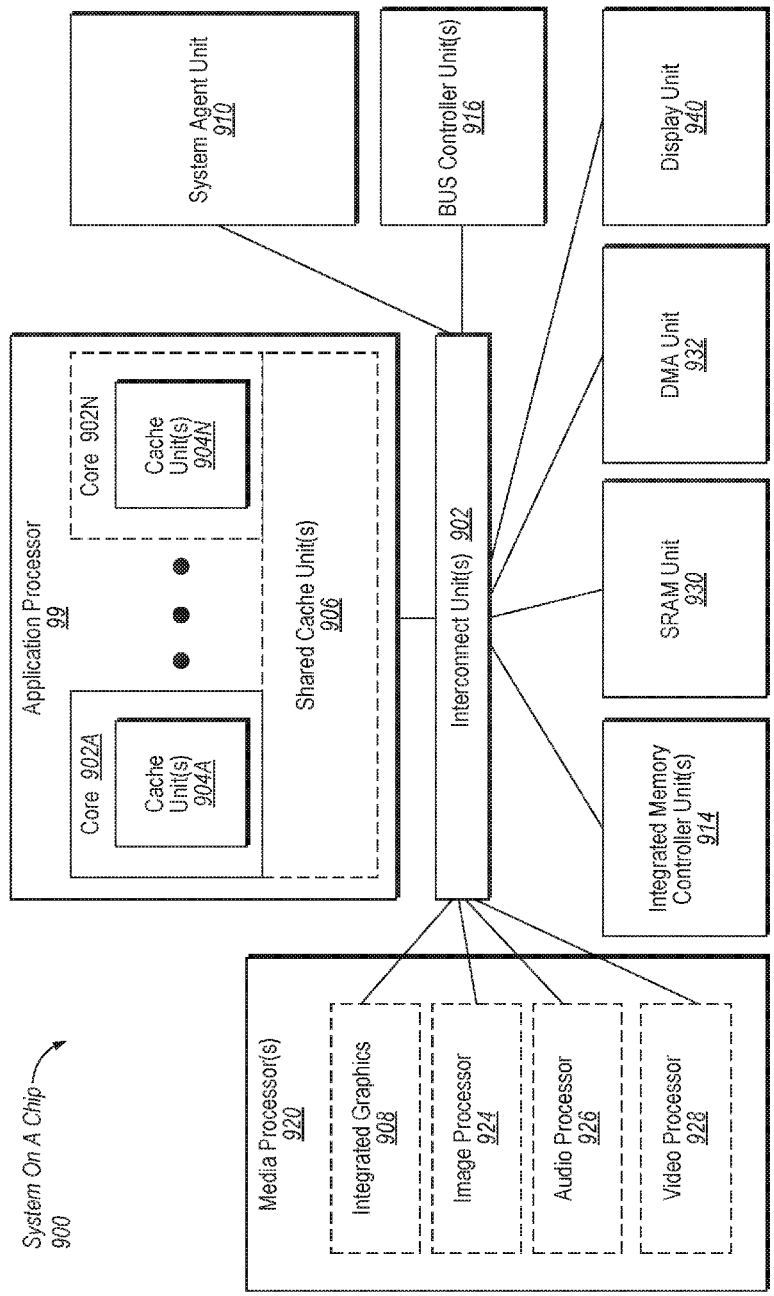
FIG. 9 is a block diagram of a system-on-a-chip according to some embodiments.

Referring now to FIG. 9, shown is a block diagram of a SoC 900 in accordance with an embodiment of the present disclosure. Similar elements in FIG. 9 bear like reference numerals. Also, dashed lined boxes are features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
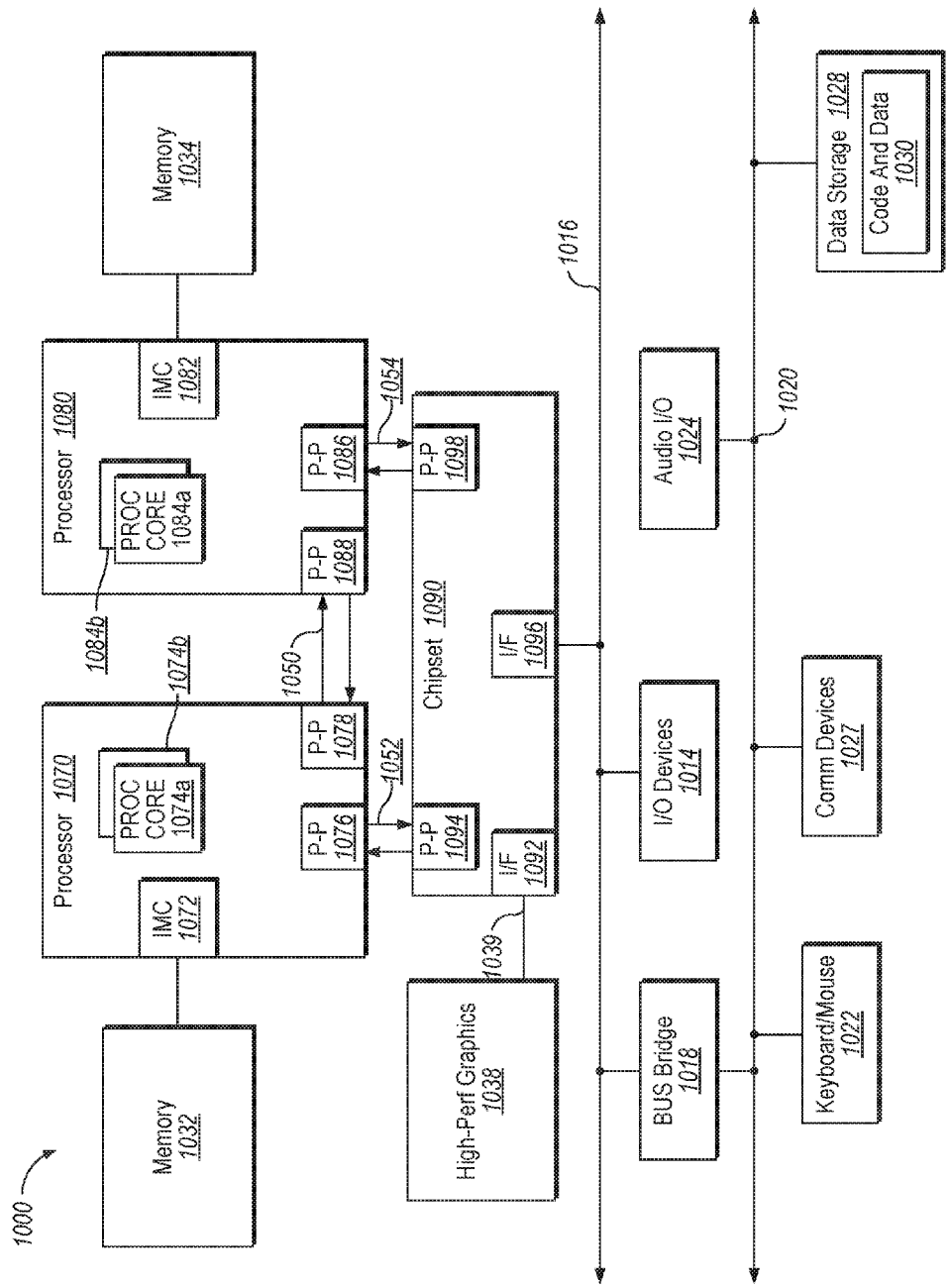
FIG. 10 is a block diagram of a computer system according to some embodiments.

Embodiments may be implemented in many different system types. Referring now to FIG. 10, shown is a block diagram of a multiprocessor system 1000 in accordance with some embodiments. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074a and 1074b and processor cores 1084a and 1084b), although potentially many more cores may be present in the processors. The processors each may include hybrid write mode logics in accordance with an embodiment of the present.

While shown with two processors 1070, 1080, it is to be understood that the scope of the present disclosure is not so limited. In other embodiments, one or more additional processors may be present in a given processor.

Processors 1070 and 1080 are shown including integrated memory controller units 8102 and 8102, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
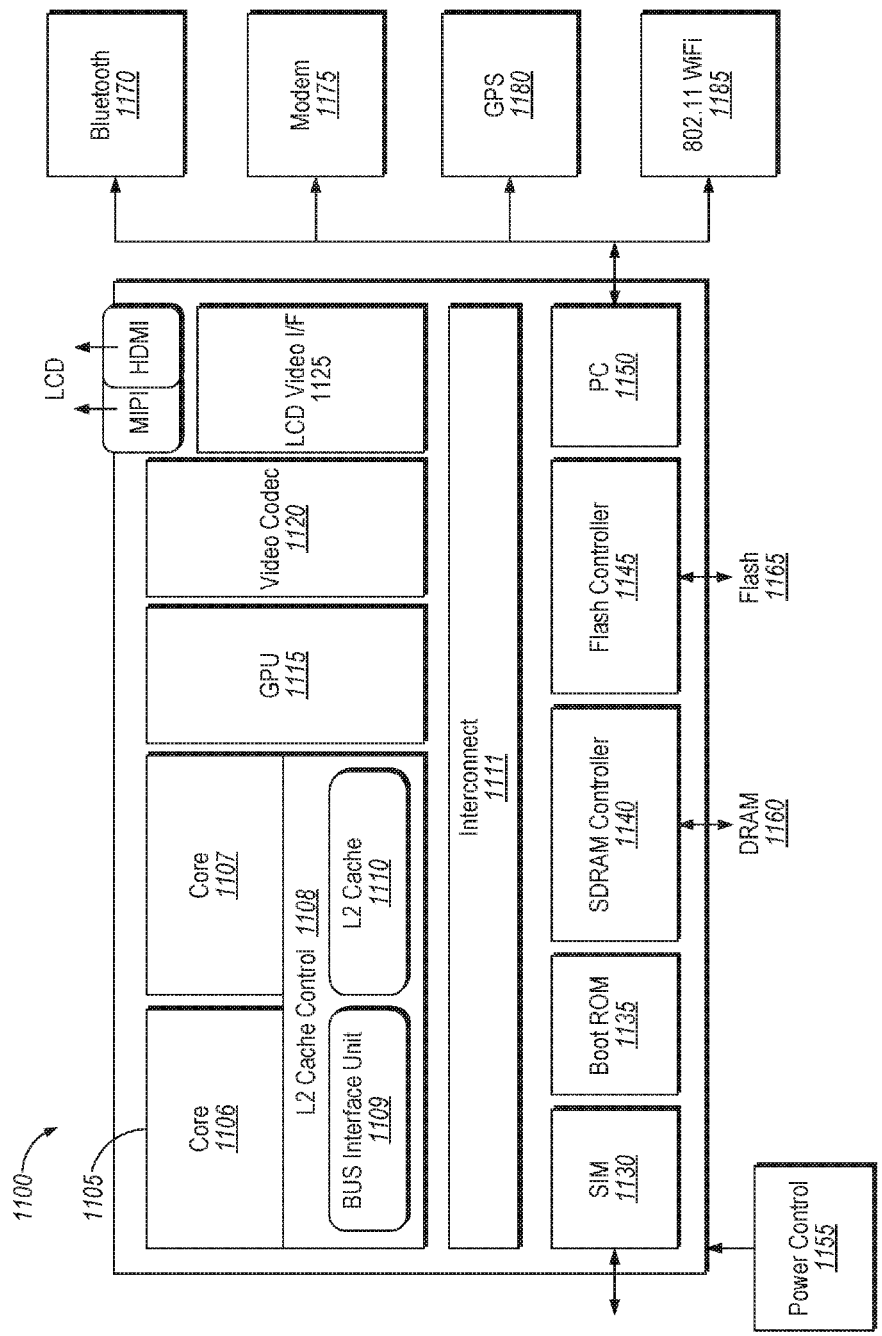
FIG. 11 illustrates another example block diagram for a computing system according to some embodiments.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with persistent or non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, modem 1175 (e.g., 3G, 4G, Long Term Evolution (LTE), LTE-Advanced, etc.), GPS 1180, Wi-Fi 1185, Zigbee (not shown), and Z-Wave (not shown). Note as stated above, a UE includes a radio for communication. As a result, these peripheral communication modules may not all be included. However, in a UE some form of a radio for external communication should be included.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to hybrid-threading in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1or 0. Instead, the logic gate is one coupled in some manner that during operation the 1or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present specification, a detailed description has been given with reference to specific example embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following examples pertain to further embodiments.

Example 1 is an apparatus that includes a memory management unit (MMU) that is operable to receive a translation request for an original address and translate the original address to a translated address as a second-level address translation service (ATS), and a first address translator coupled to the MMU, the first address translator having an associated cache to store the original address and the translated address, where the first address translator is to translate memory addresses as a first-level ATS, where the first address translator is to determine whether a transaction is to be processed using either the first-level ATS or the second-level ATS, translate a current memory address of the transaction to a current translated address using the first-level ATS or the second-level ATS based on the determination, and dispatch the transaction with the current translated address to a memory device.

In Example 2, the subject matter of Example 1, where the first address translator is to substitute the current memory address with the translated address stored in the associated cache to translate the current memory address to the current translated address when determined to process the transaction using the first-level ATS, and where the first address translator is to send a translation request to the MMU to translate the current memory address to the current translated address and to receive a response from the MMU with the current translated address when determined to process the transaction using the second-level ATS.

In Example 3, the subject matter of any one of Examples 1-2, where, when determining whether the transaction is to be processed using either the first-level ATS or the second-level ATS, the first address translator is to check the associated cache to determine whether the current memory address relates to the original address stored in the associated cache, when the current memory address is related to the original address stored in the associated cache, substitute the original address in the transaction with the translated address, and when the current memory address is not related to the original address stored in the associated cache, generate the translation request to send to the MMU to translate the current memory address to the current translated address.

In Example 4, the subject matter of any one of Examples 1-3 further including a second address translator, where the second address translator is to translate memory addresses as a first-level ATS, where the first address translator is coupled to a first functional unit and the second address translator is coupled to a second functional unit, and an arbiter coupled between the MMU and each of the first address translator and the second address translator, where the arbiter is to receive the translation request from the first address translator and a second translation request from the second address translator, determine a priority for the translation request and the second translation request, and dispatch at least one of the translation request and the second translation request to the MMU according to the determined priority.

In Example 5, the subject matter of any one of Examples 1-4, where the first address translator is further to determine whether a second transaction that includes a second current memory address is to be processed using either the first-level ATS or the second-level ATS by checking the associated cache to determine whether the second current memory address corresponds to the original address stored in the associated cache, when the second current memory address corresponds to the original address, substitute the second current memory address of the second transaction with the translated address, and dispatch the second transaction with the translated address to the memory device.

In Example 6, the subject matter of any one of Examples 1-5, where the first address translator is to send a third translation request to the MMU to translate the a second current memory address and to receive a response from the MMU with a second current translated address when determined to process the second transaction using the second-level ATS, and upon receiving the second current translated address from the MMU, the first address translator is further to substitute the original address stored in the associated cache with the second current translated address.

In Example 7, the subject matter of any one of Examples 1-6, where the transaction and the second transaction comprise linear data, where the transaction includes a head-of-transaction indicator, which indicates to the first address translator that the transaction is to be processed using the second-level ATS, where the second transaction does not comprise the head-of-transaction indicator which indicates to the first address translator that the second transaction is to be processed using the first-level ATS, where the first address translator is to determine whether the transaction includes the head-of-transaction indicator to determine whether the transaction is to be processed using either the first-level ATS or the second-level ATS.

In Example 8, the subject matter of any one of Examples 1-7, where the original address is a base address that corresponds to a memory page, where the translated address is a physical memory address.

In Example 9, the subject matter of any one of Examples 1-8, where the transaction includes a burst notation to indicate that data associated with the transaction is within an address boundary, where the first address translator is further to receive a third transaction including the burst notation, determine whether the third transaction is to be processed using either the first-level ATS or the second-level ATS by identifying whether the third transaction includes the burst notation, and dispatch the third transaction with the translated address to the memory device when the third transaction does not does not comprise the burst notation.

In Example 10, the subject matter of any one of Examples 1-9, where the first address translator is to associate the translated address with the third transaction before dispatching the third transaction to the memory device.

Example 11 is a system that includes a memory device, a memory management unit (MMU) coupled to the memory device, the MMU being operable to receive a translation request for an original address and translate the original address to a translated address as a second-level address translation service (ATS), a first peripheral device, a first address translator coupled to the MMU and the first peripheral device, the first address translator having an associated cache to store the original address and the first translated address, where the first address translator is to translate memory addresses as a first-level ATS, where the first address translator is to receive, from the first peripheral device, a transaction with a current memory address, determine whether the transaction is to be processed using either the first-level ATS or the second-level ATS, translate the current memory address of the transaction to a current translated address using the first-level ATS or the second-level ATS based on the determination, and dispatch the transaction with the current translated address to the memory device.

In Example 12, the subject matter of Example 11, where the first address translator is to substitute the current memory address with the translated address stored in the associated cache to translate the current memory address to the current translated address when determined to process the transaction using the first-level ATS, and where the first address translator is to send a translation request to the MMU to translate the current memory address to the current translated address and to receive a response from the MMU with the current translated address when determined to process the transaction using the second-level ATS.

In Example 13, the subject matter of any one of Examples 11-12, further including a second address translator associated with a second peripheral device, where the second address translator is to translate memory addresses as a first-level ATS for the second peripheral device, where the first address translator is coupled to a first functional unit and the second address translator is coupled to a second functional unit, and an arbiter coupled between the MMU and each of the first address translator and second address translator, where the arbiter is to receive the translation request from the first address translator and a second translation request from the second address translator, determine a priority for the translation request and the second translation request, and dispatch the translation request or the second translation request to the MMU according to the determined priority.

In Example 14, the subject matter of any one of Examples 11-13, where the first address translator is further to determine whether a second transaction including the current memory address is to be processed using either the first-level ATS or the second-level ATS by checking the associated cache to determine whether the current memory address corresponds to the original address stored in the associated cache, when the current memory address corresponds to the original address, substitute the current memory address of the second transaction with the translated address, and dispatch the second transaction with the translated address to the memory device.

In Example 15, the subject matter of any one of Examples 11-14, where the transaction and the second transaction comprise linear data, where the transaction includes a head-of-transaction indicator which indicates to the first address translator that the transaction is to be processed using the second-level ATS, where the second transaction does not comprise the head-of-transaction indicator, which indicates to the first address translator that the second transaction is to be processed using the first-level ATS, where the first address translator is to determine whether the transaction includes the head-of-transaction indicator to determine whether the transaction is to be processed using either the first-level ATS or the second-level ATS.

In Example 16, the subject matter of any one of Examples 11-15, where the transaction includes a burst notation to indicate that data associated with the transaction is within an address boundary, where the first address translator is further to receive a third transaction including the burst notation, determine whether the third transaction is to be processed using either the first-level ATS or the second-level ATS by identifying whether the third transaction includes the burst notation, and dispatch the third transaction with the translated address to the memory device.

In Example 17, the subject matter of any one of Examples 11-16, where before dispatching the third transaction to the memory device, the first address translator is to associate the translated address with the third transaction.

Example 18 is a method that includes identifying, by a first address translator from a first device, a transaction with a current memory address, determining whether the transaction is to be processed using either a first-level address translation service (ATS) that is associated with the first address translator, or a second-level ATS that is associated with a memory management unit (MMU), translating the current memory address of the transaction to a current translated address using the first-level ATS or the second-level ATS based on the determination, and dispatching the transaction with the current translated address to a memory device.

In Example 19, the subject matter of Example 18, where determining whether the transaction is to be processed using either the first-level ATS or the second-level ATS includes checking an associated cache to determine whether the current memory address relates to an original address stored in the associated cache, substituting the original address in the transaction with the translated address when the current memory address is related to the original address stored in the associated cache, and generating a translation request to send to the MMU to translate the current memory address to the current translated address when the current memory address is not related to the original address stored in the associated cache.

In Example 20, the subject matter of any one of Examples 18-19 further including determining whether a second transaction including a second current memory address is to be processed using either the first-level ATS or the second-level ATS by checking the associated cache to determine whether the second current memory address corresponds to the original address stored in the associated cache, substituting the second current memory address of the second transaction with the translated address when the second current memory address corresponds to the original address, and dispatching the second transaction with the translated address to the memory device.

In Example 21, the subject matter of any one of Examples 18-20, where the translating includes when determined to process the transaction using the first-level ATS, substituting the current memory address with the translated address stored in an associated cache to translate the current memory address to the current translated address, and when determined to process the transaction using the second-level ATS, sending a translation request to the MMU to translate the current memory address to the current translated address and receiving a response from the MMU with the current translated address.

In Example 22, the subject matter of any one of Examples 18-21, where determining whether the transaction is to be processed using either the first-level ATS or the second-level ATS includes checking the associated cache to determine whether the current memory address is related to an original address stored in the associated cache.

In Example 23, the subject matter of any one of Examples 18-22, where determining whether the transaction is to be processed using either the first-level ATS or the second-level ATS includes checking the transaction for a head-of-transaction indicator, processing the transaction using the first-level ATS when the transaction does not include the head-of-transaction indicator, and processing the transaction using the second-level ATS when the transaction includes the head-of-transaction indicator.

In Example 24, the subject matter of any one of Examples 18-23, where determining whether the transaction is to be processed using either the first-level ATS or the second-level ATS includes checking the transaction for a burst notation and a unique header, processing the transaction using the first-level ATS when the transaction includes the burst notation and does not include the unique header, and processing the transaction using the second-level ATS when the transaction includes the burst notation and does include the unique header.

Example 25 is a non-transitory machine-readable storage medium that includes data that, when accessed by a processing device, cause the processing device to perform operations including identifying, by the processing device, a transaction with a current memory address, determining whether the transaction is to be processed using either a first-level address translation service (ATS) that is associated with a first address translator, or a second-level ATS that is associated with a memory management unit (MMU), translating the current memory address of the transaction to a current translated address using the first-level ATS or the second-level ATS based on the determination, and dispatching the transaction with the current translated address to a memory device.

In Example 26, the subject matter of Example 25, where the translating includes when determined to process the transaction using the first-level ATS, substituting the current memory address with the translated address stored in an associated cache to translate the current memory address to the current translated address, and when determined to process the transaction using the second-level ATS, sending a translation request to the MMU to translate the current memory address to the current translated address and receiving a response from the MMU with the current translated address.

In Example 27, the subject matter of any one of Examples 25-26, where determining whether the transaction is to be processed using either the first-level ATS or the second-level ATS includes checking the associated cache to determine whether the current memory address is related to an original address stored in the associated cache.

In Example 28, the subject matter of any one of Examples 25-27, where determining whether the transaction is to be processed using either the first-level ATS or the second-level ATS includes checking the transaction for a head-of-transaction indicator, processing the transaction using the first-level ATS when the transaction does not include the head-of-transaction indicator, and processing the transaction using the second-level ATS when the transaction includes the head-of-transaction indicator.

In Example 29, the subject matter of any one of Examples 25-28, where determining whether the transaction is to be processed using either the first-level ATS or the second-level ATS includes checking the transaction for a burst notation and a unique header, processing the transaction using the first-level ATS when the transaction includes the burst notation and does not include the unique header, and processing the transaction using the second-level ATS when the transaction includes the burst notation and does include the unique header.

Example 30 is a machine-readable storage medium that includes data that, when executed by a processor, cause the processor to perform operations including identifying, by the processor, a transaction with a current memory address, determining whether the transaction is to be processed using either a first-level address translation service (ATS) that is associated with a first address translator, or a second-level ATS that is associated with a memory management unit (MMU), translating the current memory address of the transaction to a current translated address using the first-level ATS or the second-level ATS based on the determination, and dispatching the transaction with the current translated address to a memory device.

In Example 31, the subject matter of Example 30, where the translating includes when determined to process the transaction using the first-level ATS, substituting the current memory address with the translated address stored in an associated cache to translate the current memory address to the current translated address, and when determined to process the transaction using the second-level ATS, sending a translation request to the MMU to translate the current memory address to the current translated address and receiving a response from the MMU with the current translated address.

In Example 32, the subject matter of any one of Examples 30-31, where determining whether the transaction is to be processed using either the first-level ATS or the second-level ATS includes checking the associated cache to determine whether the current memory address is related to an original address stored in the associated cache.

In Example 33, the subject matter of any one of Examples 30-32, where determining whether the transaction is to be processed using either the first-level ATS or the second-level ATS includes checking the transaction for a head-of-transaction indicator, processing the transaction using the first-level ATS when the transaction does not include the head-of-transaction indicator, and processing the transaction using the second-level ATS when the transaction includes the head-of-transaction indicator.

In Example 34, the subject matter of any one of Examples 30-33, where determining whether the transaction is to be processed using either the first-level ATS or the second-level ATS includes checking the transaction for a burst notation and a unique header, processing the transaction using the first-level ATS when the transaction includes the burst notation and does not include the unique header, and processing the transaction using the second-level ATS when the transaction includes the burst notation and does include the unique header.

Example 35 includes an apparatus that includes means for identifying, by a processing device, a transaction with a current memory address, means for determining whether the transaction is to be processed using either a first-level address translation service (ATS) that is associated with a first address translator, or a second-level ATS that is associated with a memory management unit (MMU), means for translating the current memory address of the transaction to a current translated address using the first-level ATS or the second-level ATS based on the determination, and means for dispatching the transaction with the current translated address to a memory device.

In Example 36, the subject matter of Example 35, where the means for translating includes means for substituting the current memory address with the translated address stored in an associated cache to translate the current memory address to the current translated address when determined to process the transaction using the first-level ATS, and means for sending a translation request to the MMU to translate the current memory address to the current translated address and receiving a response from the MMU with the current translated address when determined to process the transaction using the second-level ATS.

In Example 37, the subject matter of any one of Examples 35-36, where the means for determining whether the transaction is to be processed using either the first-level ATS or the second-level ATS includes means for checking the associated cache to determine whether the current memory address is related to an original address stored in the associated cache.

In Example 38, the subject matter of any one of Examples 35-37, where the means for determining whether the transaction is to be processed using either the first-level ATS or the second-level ATS includes means for checking the transaction for a head-of-transaction indicator, means for processing the transaction using the first-level ATS when the transaction does not include the head-of-transaction indicator, and means for processing the transaction using the second-level ATS when the transaction includes the head-of-transaction indicator.

In Example 39, the subject matter of any one of Examples 35-38, where the means for determining whether the transaction is to be processed using either the first-level ATS or the second-level ATS includes means for checking the transaction for a burst notation and a unique header, means for processing the transaction using the first-level ATS when the transaction includes the burst notation and does not include the unique header, and means for processing the transaction using the second-level ATS when the transaction includes the burst notation and does include the unique header.

Example 40 is a machine readable medium that includes code, when executed, to cause a machine to perform the method of any one of claims 18 to 24.

Example 41 is an apparatus that includes means for performing the method of any one of claims 18 to 22.

Example 42 is an apparatus that includes a processor configured to perform the method of any one of claims 18 to 22.

Example 43 is a machine-readable storage that includes machine-readable instructions, when executed, to implement a method or realize an apparatus as claimed in any preceding claim.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," "monitoring," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a first address translator circuit coupled to a first functional unit of the processor, the first address translator circuit to translate a first original address to a first translated address as a first-level address translation service (ATS), the first address translator circuit comprising a cache to store the first original address and the first translated address;
   a second address translator circuit coupled to a second functional unit of the processor, the second address translator circuit to translate a second original address to a second translated address as a first-level ATS, the second address translator circuit comprising a cache to store the second original address and the second translated address;
   an arbiter circuit coupled to the first address translator circuit and the second address translator circuit; and
   a memory management circuit coupled to the arbiter circuit, the memory management circuit to translate addresses as a second-level ATS when requested by at least one of the first address translator circuit or the second address translator circuit.

2. The processor of claim 1, wherein the memory management circuit is to:
   receive a translation request from the first address translator circuit;
   translate the first original address to the first translated address; and
   send a translation response to the first address translator circuit, the translation response comprising the first translated address.

3. The processor of claim 1, wherein the first address translator circuit is to:
   determine whether a transaction with the first original address is to be processed using either the first-level ATS or the second-level ATS;
   translate the first original address to the first translated address based on a determination to translate using the first-level ATS;
   send a translation request with the transaction to the memory management circuit to translate the first original address to the first translated address based on a determination to translate using the second-level ATS; and
   receive a translation response with the first translated address from the memory management circuit.

4. The processor of claim 3, wherein the first address translator circuit is to dispatch the transaction with the first translated address to a memory device.

5. The processor of claim 4, further comprising a second arbiter circuit coupled between the first translation circuit and the memory device.

6. The processor of claim 3, wherein the first address translator circuit is to substitute the first original address with the first translated address stored in the cache to translate the first original address to the first translated address when determined to process the transaction using the first-level ATS.

7. The processor of claim 3, wherein, to determine whether the transaction is to be processed using either the first-level ATS or the second-level ATS, the first address translator circuit is to:
   check whether the cache already stores the first original address and the first translated address;
   when already stored in the cache, substitute the first original address in the transaction with the first translated address stored in the cache; and
   when not already stored in the cache, generate the translation request to send to the memory management circuit to translate the first original address to the first translated address.

8. The processor of claim 3, wherein the arbiter circuit is to:
   receive the translation request from the first address translator circuit and a second translation request from the second address translator circuit,
   determine a priority for the translation request and the second translation request, and dispatch at least one of the translation request and the second translation request to the memory management circuit according to the priority.

9. The processor of claim 3, wherein the transaction comprises a burst notation to indicate that data associated with the transaction is within an address boundary, and wherein the first address translator circuit is to:
receive a second transaction comprising a second original address;
substitute the second original address with the first translated address when the second transaction comprise the burst notation; and
dispatch the second transaction with the first translated address to a memory device.

10. The processor of claim 9, wherein the first address translator circuit is to associate the first translated address with the second transaction before dispatching the second transaction to the memory device.

11. The processor of claim 1, wherein the first original address is a base address that corresponds to a memory page, wherein the first translated address is a physical memory address.

12. A system comprising:
a first device;
a second device;
a memory device;
a memory management circuit coupled to the memory device, the memory management circuit to receive a translation request for an original address and translate the original address to a translated address as a second-level address translation service (ATS);
a first address translator circuit coupled to the memory management circuit and the first device, the first address translator circuit having an associated cache to store a first original address and a first translated address, wherein the first address translator circuit is to translate memory addresses as a first-level ATS;
a second address translator circuit coupled to the memory management circuit and the second device, the second address translator circuit having an associated catch to store a second original address and a second translated address, wherein the second address translator circuit is to translate memory addresses as a first-level ATS; and
an arbiter circuit coupled between the memory management circuit and the first address translator circuit and between the memory management circuit and the second address translator circuit, the arbiter circuit to prioritize multiple translation requests from the first address translator circuit and the second address translator circuit for the memory management circuit.

13. The system of claim 12, wherein the first address translator circuit is to:
receive, from the first device, a transaction with a current memory address;
determine whether the transaction is to be processed using either the first-level ATS or the second-level ATS;
translate the current memory address of the transaction to a current translated address using the first-level ATS or the second-level ATS based on the determination; and
dispatch the transaction with the current translated address to the memory device.

14. The system of claim 13, wherein the first address translator circuit is to substitute the current memory address with the translated address stored in the associated cache to translate the current memory address to the current translated address when determined to process the transaction using the first-level ATS, and wherein the first address translator circuit is to send a translation request to the memory management circuit via the arbiter to translate the current memory address to the current translated address and to receive a response from the memory management circuit with the current translated address when determined to process the transaction using the second-level ATS.

15. The system of claim 13, wherein the first address translator circuit is further to:
determine whether a second transaction comprising the current memory address is to be processed using either the first-level ATS or the second-level ATS by checking the associated cache to determine whether the current memory address corresponds to the first original address stored in the associated cache;
when the current memory address corresponds to the first original address, substitute the current memory address of the second transaction with the first translated address; and
dispatch the second transaction with the first translated address to the memory device.

16. The system of claim 15, wherein the transaction and the second transaction comprise linear data, wherein the transaction comprises a head-of-transaction indicator which indicates to the first address translator circuit that the transaction is to be processed using the second-level ATS, wherein the second transaction does not comprise the head-of-transaction indicator, which indicates to the first address translator circuit that the second transaction is to be processed using the first-level ATS, wherein the first address translator circuit is to determine whether the transaction comprises the head-of-transaction indicator to determine whether the transaction is to be processed using either the first-level ATS or the second-level ATS.

17. The system of claim 13, wherein the transaction comprises a burst notation to indicate that data associated with the transaction is within an address boundary, wherein the first address translator circuit is further to:
receive a third transaction comprising the burst notation;
determine whether the third transaction is to be processed using either the first-level ATS or the second-level ATS by identifying whether the third transaction comprises the burst notation; and
dispatch the third transaction with the first translated address to the memory device.

18. The system of claim 12, wherein the arbiter circuit is to:
receive a first translation request from the first address translator circuit and a second translation request from the second address translator circuit,
determine a priority for the first translation request and the second translation request, and
dispatch the first translation request and the second translation request to the memory management circuit according to the priority.

19. A method comprising:
identifying, by a first address translator circuit from a first device, a first transaction with a first memory address;
translating, by the first address translator circuit, the first memory address to a first translated address as a first-level address translation service (ATS);
identifying, by a second address translator circuit from a second device, a second transaction with a second memory address;
identifying, by a third address translator circuit from a third device, a third transaction with a third memory address;

arbitrating, by an arbiter circuit coupled to the second address translator circuit and the third address translator circuit, the second transaction and the third transaction to be sent to a memory management circuit coupled to the arbiter circuit;

translating, by the memory management circuit, the second memory address to a second translated address as a second-level ATS; and translating, by the memory management circuit, the third memory address to a third translated address as a second-level ATS.

20. The method of claim 19, further comprising:

dispatching the first transaction with the first translated address to a memory device;

dispatching the second transaction with the second translated address to the memory device; and dispatching the third transaction with the third translated address to the memory device.

\* \* \* \* \*